(12) United States Patent
Yamada et al.

(10) Patent No.: US 11,795,663 B2
(45) Date of Patent: Oct. 24, 2023

(54) CONTROL DEVICE OF WORK VEHICLE, WORK VEHICLE, AND CONTROL METHOD FOR WORK VEHICLE

(71) Applicant: KOMATSU LTD., Tokyo (JP)

(72) Inventors: Kenichi Yamada, Tokyo (JP); Hiroaki Ikeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 83 days.

(21) Appl. No.: 17/605,742

(22) PCT Filed: Jun. 8, 2020

(86) PCT No.: PCT/JP2020/022585
§ 371 (c)(1),
(2) Date: Oct. 22, 2021

(87) PCT Pub. No.: WO2020/250862
PCT Pub. Date: Dec. 17, 2020

(65) Prior Publication Data
US 2022/0220704 A1  Jul. 14, 2022

(30) Foreign Application Priority Data
Jun. 11, 2019  (JP) .................................. 2019-108554

(51) Int. Cl.
*E02F 9/22* (2006.01)
*F16H 59/44* (2006.01)
(Continued)

(52) U.S. Cl.
CPC ........... *E02F 9/2253* (2013.01); *F16H 59/44* (2013.01); *F16H 59/54* (2013.01); *F16H 59/68* (2013.01);
(Continued)

(58) Field of Classification Search
CPC ......... F16H 2059/6861; F16H 61/4008; F16H 61/4017; E02F 9/2253
See application file for complete search history.

(56) References Cited

U.S. PATENT DOCUMENTS 5,684,694 A  11/1997  Ishino et al.
5,946,910 A  9/1999  Hayashi et al.
(Continued)

FOREIGN PATENT DOCUMENTS

CN  101574032 A  11/2009
CN  102549313 A  7/2012
(Continued)

OTHER PUBLICATIONS

The International Search Report for the corresponding international application No. PCT/JP2020/022585, dated Sep. 8, 2020.

*Primary Examiner* — Abiy Teka
(74) *Attorney, Agent, or Firm* — Global IP Counselors, LLP (57) ABSTRACT

A work vehicle includes a power source, a travel device, a power transmission device, and a control device. The power transmission device includes a hydrostatic continuously variable transmission having a relief valve capable of setting a relief pressure, and is configured to transmit power of the power source to the travel device. The control device includes a relief pressure setting unit configured to set the relief pressure of the relief valve in accordance with a target output value of the travel device.

9 Claims, 8 Drawing Sheets

(51) Int. Cl.
 *F16H 59/54* (2006.01)
 *F16H 59/68* (2006.01)
 *F16H 61/4017* (2010.01)

(52) U.S. Cl.
 CPC . *F16H 61/4017* (2013.01); *F16H 2059/6861* (2013.01)

(56) References Cited

U.S. PATENT DOCUMENTS

| | | |
|---|---|---|
| 2008/0023285 A1 | 1/2008 | Tsunekawa |
| 2012/0152641 A1 | 6/2012 | Takahashi et al. |
| 2012/0276961 A1 | 11/2012 | Momma |
| 2012/0310492 A1 | 12/2012 | Karasawa et al. |
| 2014/0200775 A1 | 7/2014 | Shirao |
| 2018/0180179 A1 | 6/2018 | Kawamoto et al. |
| 2018/0231118 A1* | 8/2018 | Kaneko ............... F16H 61/4017 |

FOREIGN PATENT DOCUMENTS

| | | | |
|---|---|---|---|
| CN | 102741483 | A | 10/2012 |
| CN | 103688089 | A | 3/2014 |
| CN | 108291635 | A | 7/2018 |
| EP | 1 132 657 | A2 | 9/2001 |
| JP | 6-174073 | A | 6/1994 |
| JP | 9-32045 | A | 2/1997 |
| JP | 10219752 | A * | 8/1998 |
| JP | 2008-32109 | A | 2/2006 |
| JP | 2006-292104 | A | 10/2006 |
| JP | 2008-196564 | A | 8/2008 |
| JP | 2012-231331 | A | 11/2012 |
| JP | 2013-117242 | A | 6/2013 |
| JP | 2014-119108 | A | 6/2014 |
| JP | 6201019 | B2 * | 9/2017 |
| WO | 2004/053337 | A1 | 6/2004 |
| WO | 2017/043459 | A1 | 3/2017 |

* cited by examiner

CONTROL DEVICE OF WORK VEHICLE, WORK VEHICLE, AND CONTROL METHOD FOR WORK VEHICLE

CROSS-REFERENCE TO RELATED APPLICATIONS

This application is a U.S. National stage application of International Application No. PCT/JP2020/022585, filed on Jun. 8, 2020. This U.S. National stage application claims priority under 35 U.S.C. § 119(a) to Japanese Patent Application No. 2019-108554, filed in Japan on Jun. 11, 2019, the entire contents of which are hereby incorporated herein by reference.

BACKGROUND

Field of the Invention

The present invention relates to a control device of a work vehicle, a work vehicle, and a control method for a work vehicle.

BACKGROUND INFORMATION

A work vehicle such as a wheel loader provided with a continuously variable transmission is known. Examples of a continuously variable transmission include a hydraulic static transmission (HST) and a hydraulic mechanical transmission (HMT). Patent Document 1 discloses a technique of controlling a pump capacity of the HST in order to reduce a sudden feeling of acceleration that occurs when a clutch of the one-pump two-motor type HST is operated.

SUMMARY

As described in Japanese Unexamined Patent Application, First Publication No. 2012-231331, the pressure of an HST circuit of a continuously variable transmission mounted on the work vehicle may increase more than necessary due to various factors. For example, the pressure of the HST circuit rapidly changes when load fluctuation occurs due to work such as excavation and dozing or when load fluctuation occurs due to braking. When the pressure of the HST circuit rapidly increases, output torque increases more than necessary and riding comfort of the work vehicle deteriorates.

The object of the present invention is to provide a control device of a work vehicle, the work vehicle, and a control method for the work vehicle which can prevent a rapid change of output torque due to load fluctuation of a continuously variable transmission.

According to one aspect of the present invention, in a control device of a work vehicle that includes a power source; a travel device; and a power transmission device that includes a hydrostatic continuously variable transmission having a relief valve capable of setting a relief pressure, and is configured to transmit power of the power source to the travel device, the control device of the work vehicle comprises: a relief pressure setting unit that is configured to set the relief pressure of the relief valve in accordance with a target output value of the travel device.

According to the above aspect, the control device of the work vehicle can prevent a rapid change of the output torque due to load fluctuation of the power transmission device.

DETAILED DESCRIPTION OF EMBODIMENT(S)

First Embodiment

Embodiments will be described below in detail with reference to the drawings.

Figure 1:
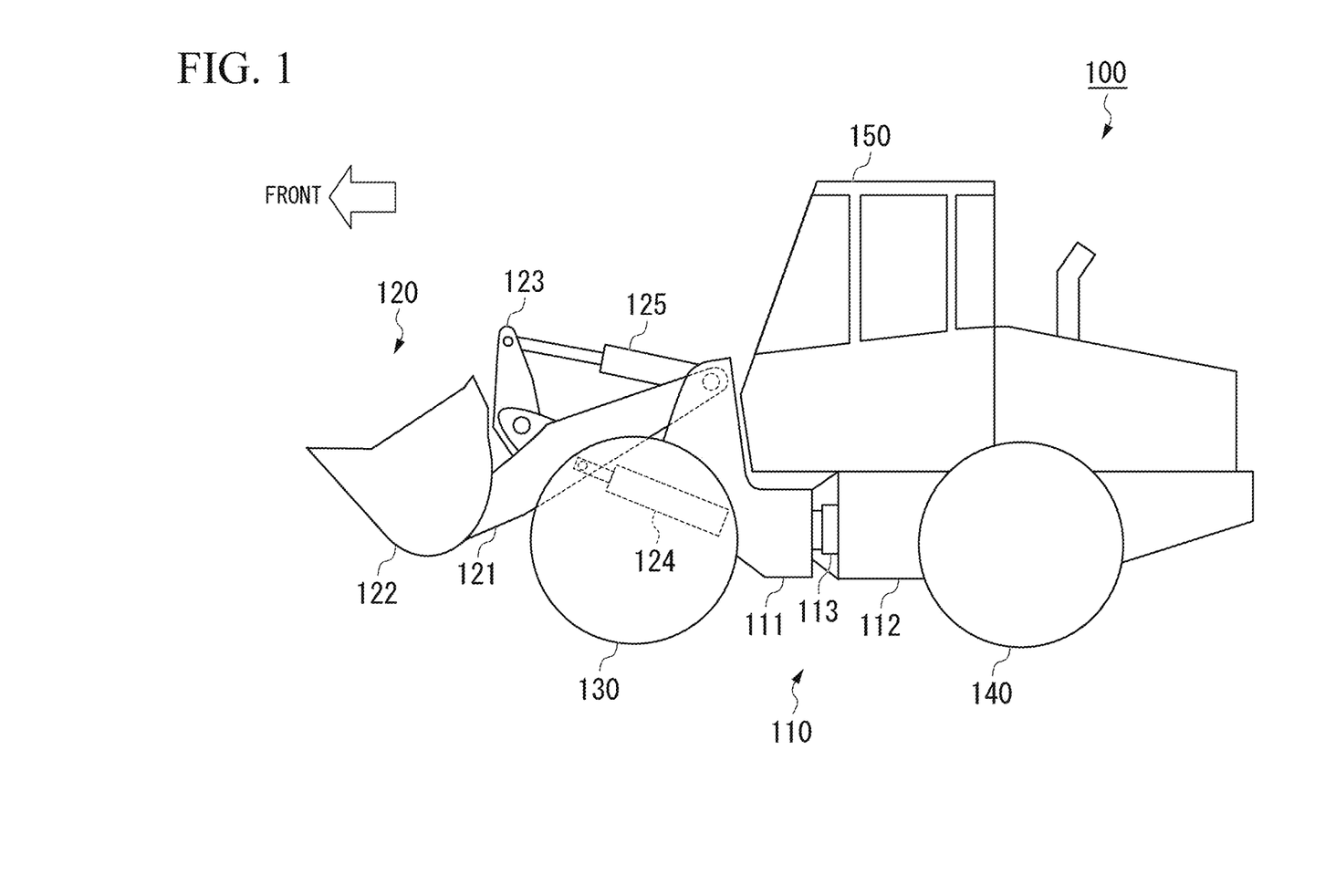
FIG. 1 is a side view of a work vehicle according to a first embodiment.

FIG. 1 is a side view of a work vehicle according to a first embodiment.

A work vehicle 100 according to the first embodiment is a wheel loader.

The work vehicle 100 includes a vehicle body 110, work equipment 120, a front wheel portion 130, a rear wheel portion 140, and a cab 150. The work vehicle 100 is an example of a power machine.

The vehicle body 110 includes a front vehicle body 111, a rear vehicle body 112, and a steering cylinder 113. The front vehicle body 111 and the rear vehicle body 112 are rotatably attached to each other around a steering axis extending in a vertical direction of the vehicle body 110. The front wheel portion 130 is provided in a lower portion of the front vehicle body 111, and the rear wheel portion 140 is provided in a lower portion of the rear vehicle body 112.

The steering cylinder 113 is a hydraulic cylinder. A base end portion of the steering cylinder 113 is attached to the rear vehicle body 112, and a distal end portion thereof is attached to the front vehicle body 111. The steering cylinder 113 expands and contracts by hydraulic oil to define an angle between the front vehicle body 111 and the rear vehicle body 112. That is, a steering angle of the front wheel portion 130 is defined by the expansion and contraction of the steering cylinder 113.

The work equipment 120 is used for excavating and transporting a work object such as earth. The work equipment 120 is provided in a front portion of the vehicle body 110. The work equipment 120 includes a boom 121, a bucket 122, a bell crank 123, a lift cylinder 124, and a bucket cylinder 125.

A base end portion of the boom 121 is attached to the front portion of the front vehicle body 111 via a pin.

The bucket 122 includes a blade for excavating the work object and a container which transports the excavated work object. A base end portion of the bucket 122 is attached to a distal end portion of the boom 121 via a pin.

The bell crank 123 transmits power of the bucket cylinder 125 to the bucket 122. A first end of the bell crank 123 is attached to a bottom portion of the bucket 122 via a link mechanism. A second end of the bell crank 123 is attached to a distal end portion of the bucket cylinder 125 via a pin.

The lift cylinder 124 is a hydraulic cylinder. A base end portion of the lift cylinder 124 is attached to the front portion of the front vehicle body 111. A distal end portion of the lift cylinder 124 is attached to the boom 121. The lift cylinder 124 expands and contracts by the hydraulic oil, so that the boom 121 is driven in an upward direction or a downward direction.

The bucket cylinder 125 is a hydraulic cylinder. A base end portion of the bucket cylinder 125 is attached to the front portion of the front vehicle body 111. A distal end portion of the bucket cylinder 125 is attached to the bucket 122 via the bell crank 123. The bucket cylinder 125 expands and contracts by the hydraulic oil, so that the bucket 122 swings in a tilt direction or a dump direction.

The cab 150 is a space in which an operator gets on and performs an operation of the work vehicle 100. The cab 150 is provided in an upper portion of the rear vehicle body 112.

Figure 2:
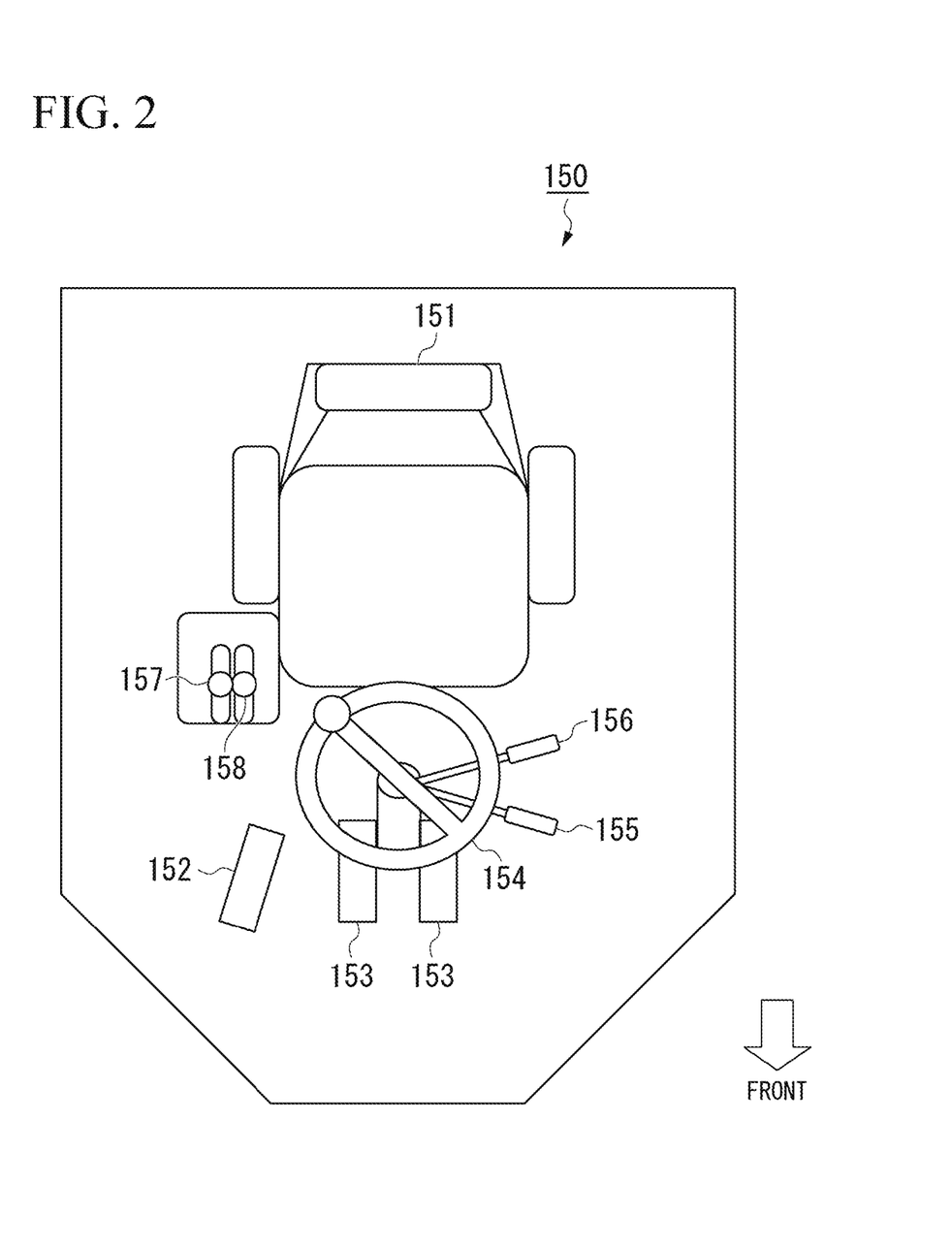
FIG. 2 is a view illustrating an internal configuration of a cab according to the first embodiment.

FIG. 2 is a view illustrating an internal configuration of the cab according to the first embodiment. A seat 151, an accelerator pedal 152, a brake pedal 153, a steering wheel 154, a forward-rearward selector switch 155, a shift switch 156, a boom lever 157, and a bucket lever 158 are provided inside the cab 150.

In addition, the work vehicle 100 may include one brake pedal 153 or a plurality of brake pedals 153. For example, when the work vehicle 100 includes two brake pedals 153 as shown in FIG. 2, a left brake pedal 153 viewed from the rear may be assigned the same function as a right brake pedal 153. Further, different functions may be assigned to the left brake pedal 153 and the right brake pedal 153. In this case, for example, the degree of engagement of the clutch may be changed in accordance with the amount of operation of the left brake pedal 153 so as to release engagement of the clutch by operation of the left brake pedal 153.

The accelerator pedal 152 is operated to set a traveling driving force (traction force) generated to the work vehicle 100. As an operation amount of the accelerator pedal 152 is larger, target driving force (target traction force) is set higher.

The brake pedal 153 is operated to set a traveling braking force generated to the work vehicle 100. As an operation amount of the brake pedal 153 is larger, the braking force is set higher.

The steering wheel 154 is operated to set the steering angle of the work vehicle 100.

The forward-rearward selector switch 155 is operated to set a traveling direction of the work vehicle 100. The traveling direction of the work vehicle is any of forward (F), rearward (R), or neutral (N).

The shift switch 156 is operated to set a speed range of a power transmission device. By operating the shift switch 156, for example, one speed range is selected from a first gear, a second gear, a third gear, and a fourth gear.

The boom lever 157 is operated to set a movement amount of a raising operation or a lowering operation of the boom 121. The boom lever 157 accepts the lowering operation by being tilted forward and accepts the raising operation by being tilted rearward.

The bucket lever 158 is operated to set a movement amount of a dump operation or a tilt operation of the bucket 122. The bucket lever 158 accepts the dump operation by being tilted forward and accepts the tilt operation by being tilted rearward.

<<Power System>>

Figure 3:
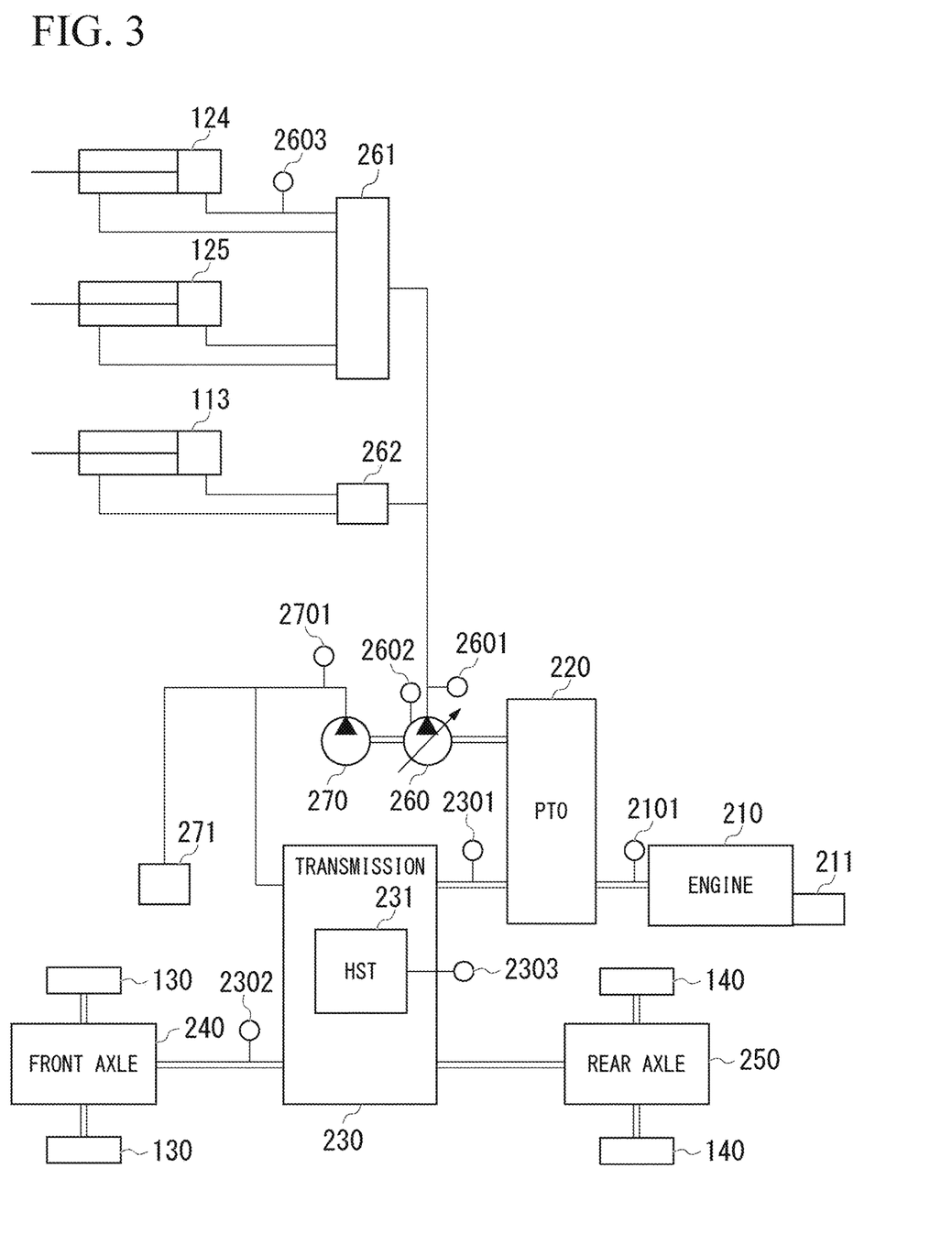
FIG. 3 is a schematic diagram illustrating a power system of the work vehicle according to the first embodiment.

FIG. 3 is a schematic diagram illustrating a power system of the work vehicle according to the first embodiment.

The work vehicle 100 includes an engine 210, a power take off (PTO) 220, a transmission 230, a front axle 240, a rear axle 250, a variable capacity pump 260, and a fixed capacity pump 270.

The engine 210 is a diesel engine, for example. The engine 210 is provided with a fuel injection device 211 and an engine tachometer 2101. The fuel injection device 211 controls the driving force of the engine 210 by adjusting an injection amount of fuel into a cylinder of the engine 210. The engine tachometer 2101 measures a rotation speed of the engine 210.

The PTO 220 transmits part of the driving force of the engine 210 to the variable capacity pump 260 and the fixed capacity pump 270. That is, the PTO 220 distributes the driving force of the engine 210 to the transmission 230, the variable capacity pump 260, and the fixed capacity pump 270.

The transmission 230 is a continuously variable transmission including an HST 231 (hydrostatic continuously variable transmission). The transmission 230 may perform gear shifting control only by the HST 231, or may be an HMT (hydraulic mechanical continuously variable transmission) that performs gear shifting control by a combination of the HST 231 and a planetary gear mechanism. The transmission 230 shifts the driving force input to an input shaft and outputs the shifted driving force from an output shaft. The input shaft of the transmission 230 is connected to the PTO 220, and the output shaft thereof is connected to the front axle 240 and the rear axle 250.

That is, the transmission 230 transmits the driving force of the engine 210 distributed by the PTO 220 to the front axle 240 and the rear axle 250. The transmission 230 is provided with an input shaft tachometer 2301 and an output shaft tachometer 2302. The input shaft tachometer 2301 measures a rotation speed of the input shaft of the transmission 230. The output shaft tachometer 2302 measures a rotation speed of the output shaft of the transmission 230. The HST 231 of the transmission 230 is provided with an HST pressure gauge 2303. The HST pressure gauge 2303 measures the pressure of the HST 231.

The front axle 240 transmits the driving force output by the transmission 230 to the front wheel portion 130. As a result, the front wheel portion 130 is rotated.

The rear axle 250 transmits the driving force output by the transmission 230 to the rear wheel portion 140. As a result, the rear wheel portion 140 is rotated.

The front axle 240 and the rear axle 250 are an example of a travel device.

The variable capacity pump 260 is driven by the driving force from the engine 210. A discharge capacity of the variable capacity pump 260 is changed, for example, by controlling a tilt angle of a swash plate provided in the variable capacity pump 260. The hydraulic oil discharged from the variable capacity pump 260 is supplied to the lift cylinder 124 and the bucket cylinder 125 via a control valve 261 and is supplied to the steering cylinder 113 via a steering valve 262.

The control valve 261 controls a flow rate of the hydraulic oil discharged from the variable capacity pump 260 and distributes the hydraulic oil to the lift cylinder 124 and the bucket cylinder 125. The steering valve 262 controls a flow rate of the hydraulic oil supplied to the steering cylinder 113.

The variable capacity pump 260 is provided with a first pump pressure gauge 2601 and a pump capacity meter 2602. The first pump pressure gauge 2601 measures a discharge pressure of the hydraulic oil from the variable capacity pump 260. The pump capacity meter 2602 measures a capacity of the variable capacity pump 260 based on an angle of the swash plate of the variable capacity pump 260 and the like.

The variable capacity pump 260 is an example of a device to which the power is distributed from the PTO 220. In another embodiment, the variable capacity pump 260 may be configured by a plurality of pumps or may have another supply destination such as a hydraulically driven fan (not shown) in place of or in addition to the variable capacity pump 260.

The lift cylinder 124 is provided with a lift pressure sensor 2603. The lift pressure sensor 2603 measures a bottom pressure of the lift cylinder 124.

The fixed capacity pump 270 is driven by the driving force from the engine 210. The hydraulic oil discharged from the fixed capacity pump 270 is supplied to a brake valve 271 in the transmission 230. The brake valve 271 controls pressure of the hydraulic oil supplied to brake cylinders (not shown) built in each of axles. By supplying the hydraulic oil to the brake cylinders, each brake disc rotating together with the rotating shafts of the front wheel portion 130 and the rear wheel portion 140 is pressed against a non-rotating plate, and thus a braking force is generated. The fixed capacity pump 270 is provided with a second pump pressure gauge 2701. The second pump pressure gauge 2701 measures a discharge pressure of the hydraulic oil from the fixed capacity pump 270. The fixed capacity pump 270 is an example of the device to which the power is distributed from the PTO 220. The fixed capacity pump 270 may include a plurality of pumps, or may have a supply destination such as a lubrication circuit (not shown).

(Configuration of HST)

Figure 4:
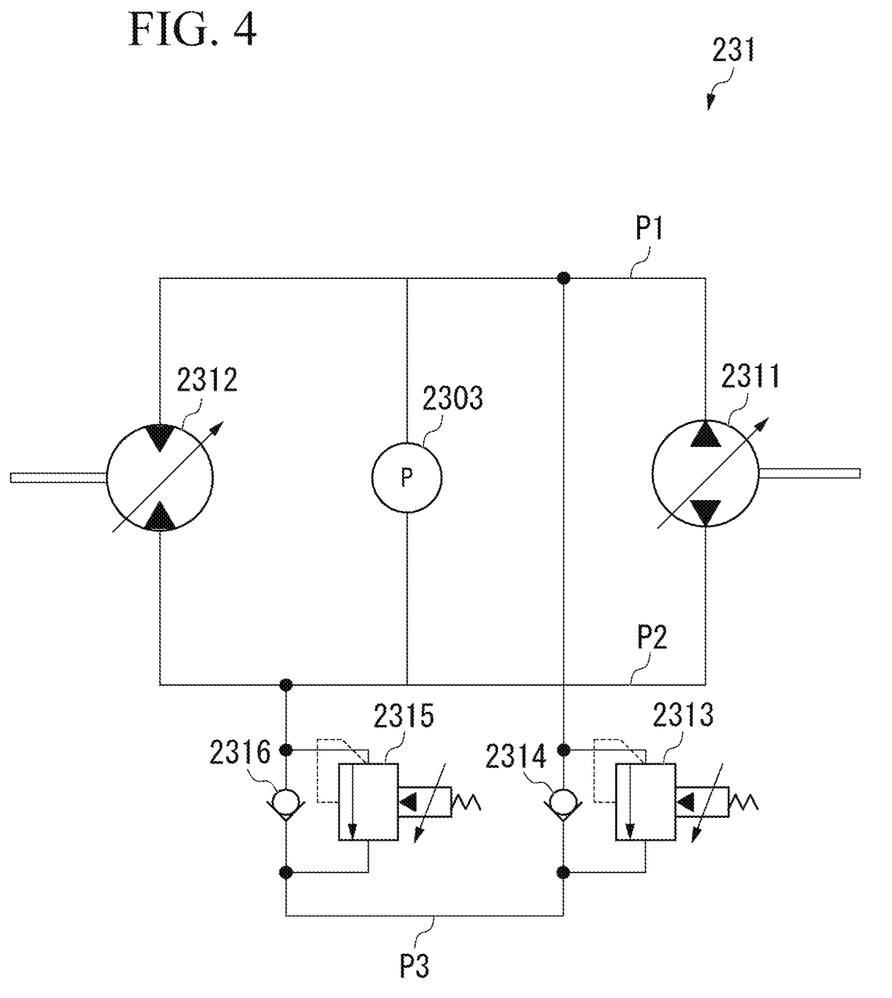
FIG. 4 is a diagram illustrating a configuration of an HST included in a transmission according to the first embodiment.

FIG. 4 is a diagram illustrating a configuration of the HST included in the transmission according to the first embodiment.

The HST 231 includes an HST pump 2311, an HST motor 2312, a first relief valve 2313, a first check valve 2314, a second relief valve 2315, and a second check valve 2316. The HST pump 2311 and the HST motor 2312 are connected to each other via a first hydraulic path P1 and a second hydraulic path P2.

The HST pump 2311 supplies the hydraulic oil to the HST motor 2312 via the first hydraulic path P1 or the second hydraulic path P2. The HST motor 2312 is driven by the hydraulic oil supplied from the HST pump 2311.

The first relief valve 2313 connects the first hydraulic path P1 and a relief bypass P3. In a case where the pressure of the first hydraulic path P1 is higher than that of the second hydraulic path P2 and a differential pressure between the first hydraulic path P1 and the second hydraulic path P2 exceeds a predetermined relief pressure, the hydraulic oil flowing through the first hydraulic path P1 passes through the relief bypass P3.

The first check valve 2314 is provided in parallel with the first relief valve 2313, blocks the hydraulic oil flowing from the first hydraulic path P1, and passes the hydraulic oil flowing from the relief bypass P3 to the first hydraulic path P1.

The second relief valve 2315 connects the second hydraulic path P2 and the relief bypass P3. In a case where the pressure of the second hydraulic path P2 is higher than that of the first hydraulic path P1 and a differential pressure between the second hydraulic path P2 and the first hydraulic path P1 exceeds a predetermined relief pressure, the hydraulic oil flowing through the second hydraulic path P2 passes through the relief bypass P3.

The second check valve 2316 is provided in parallel with the second relief valve 2315, blocks the hydraulic oil flowing from the second hydraulic path P2, and passes the hydraulic oil flowing from the relief bypass P3 to the second hydraulic path P2.

That is, when the pressure of the first hydraulic path P1 is higher than that of the second hydraulic path P2 and the differential pressure between the first hydraulic path P1 and the second hydraulic path P2 exceeds a predetermined relief pressure, the hydraulic oil flowing through the first hydraulic path P1 flows to the second hydraulic path P2 via the first relief valve 2313, the relief bypass P3 and the second check valve 2316. On the other hand, when the pressure of the second hydraulic path P2 is higher than that of the first hydraulic path P1 and the differential pressure between the first hydraulic path P1 and the second hydraulic path P2 exceeds a predetermined relief pressure, the hydraulic oil flowing through the second hydraulic path P2 flows to the first hydraulic path P1 via the second relief valve 2315, the relief bypass P3, and the first check valve 2314. In addition, a hydraulic pump (not shown) for supplying the hydraulic oil to the relief bypass P3 may be provided, for example, in order to compensate for a decrease in the oil amount due to leakage of the hydraulic oil from the HST 231.

The relief pressures of the first relief valve 2313 and the second relief valve 2315 are capable of being changed by a control signal. For example, the first relief valve 2313 and the second relief valve 2315 may each include a solenoid for pressing a spring that closes each valve, and the relief pressure may be set by changing a position of the solenoid with an electric current.

In addition, the HST pressure gauge 2303 measures the differential pressure between the first hydraulic path P1 and the second hydraulic path P2. The differential pressure between the first hydraulic path P1 and the second hydraulic path P2 may be measured by the difference between measured values of two pressure sensors by providing the pressure sensors in each of the first hydraulic path P1 and the second hydraulic path P2.

(Control Device)

The work vehicle 100 includes a control device 300 for controlling the work vehicle 100. The control device 300 is provided on the vehicle body 110, preferably in the cab 150.

The control device 300 outputs control signals to the fuel injection device 211, the transmission 230, the variable capacity pump 260, and the control valve 261 in accordance with the operation amounts of each of the operating devices (the accelerator pedal 152, the brake pedal 153, the steering wheel 154, the forward-rearward selector switch 155, the shift switch 156, the boom lever 157, and the bucket lever 158) in the cab 150.

Figure 5:
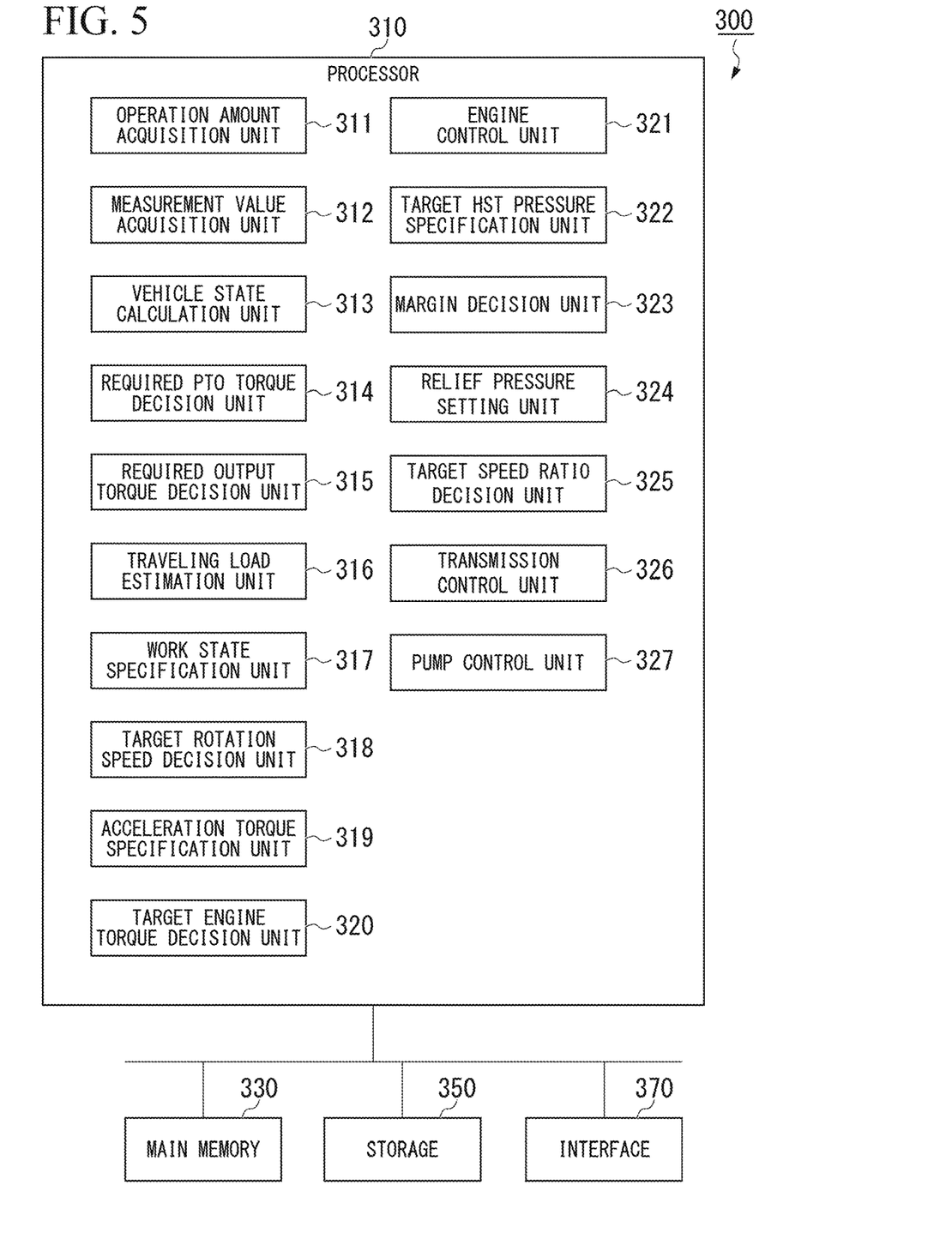
FIG. 5 is a schematic block diagram illustrating a configuration of a control device of the work vehicle according to the first embodiment.

FIG. 5 is a schematic block diagram illustrating a configuration of the control device of the work vehicle according to the first embodiment. The control device 300 is a computer which includes a processor 310, a main memory 330, a storage 350, and an interface 370.

The storage 350 is a non-transitory tangible storage medium. A hard disk drive (HDD), a solid-state drive (SSD), a magnetic disk, an optical magnetic disk, a compact disc read-only memory (CD-ROM), a digital versatile disc read-only memory (DVD-ROM), a semiconductor memory, and the like are examples of the storage 350. The storage 350 may be an internal medium directly connected to a bus of the control device 300, or an external medium connected to the control device 300 via the interface 370 or a communication line. The storage 350 stores a program for controlling the work vehicle 100.

The program may be a program for realizing some of the functions exerted by the control device 300. For example, the program may exert the functions in combination with another program already stored in the storage 350, or in combination with another program mounted on another device. In addition, in another embodiment, the control device 300 may include a custom large-scale integrated circuit (LSI) such as a programmable logic device (PLD) in addition to or in place of the configuration described above. A programmable array logic (PAL), a generic array logic (GAL), a complex programmable logic device (CPLD), and a field-programmable gate array (FPGA) are examples of the PLD. In this case, some or all of the functions realized by the processor may be realized by an integrated circuit.

In a case where the program is distributed to the control device 300 via a communication line, the control device 300 that has received the distribution may load the program into the main memory 330 and execute the processing described above.

In addition, the program may be a program for realizing some of the functions described above. Further, the program may be a so-called difference file (difference program) which realizes the functions described above in combination with another program already stored in the storage 350.

By executing the program, the processor 310 includes an operation amount acquisition unit 311, a measurement value acquisition unit 312, a vehicle state calculation unit 313, a required PTO torque decision unit 314, a required output torque decision unit 315, a traveling load estimation unit 316, a work state specification unit 317, a target rotation speed decision unit 318, an acceleration torque specification unit 319, a target engine torque decision unit 320, an engine control unit 321, a target HST pressure specification unit 322 (target circuit pressure specification unit), a margin decision unit 323, a relief pressure setting unit 324, a target speed ratio decision unit 325, and a transmission control unit 326, and a pump control unit 327.

The operation amount acquisition unit 311 acquires the operation amount from each of the accelerator pedal 152, the brake pedal 153, the steering wheel 154, the forward-rearward selector switch 155, the shift switch 156, the boom lever 157, and the bucket lever 158. Hereinafter, the operation amount of the accelerator pedal 152 is referred to as an accelerator operation amount, the operation amount of the brake pedal 153 is referred to as a brake operation amount, the operation amount of the steering wheel 154 is referred to as a steering operation amount, a value in response to an operation position of the forward-rearward selector switch 155 is referred to as an FNR operation amount, a value in response to an operation position of the shift switch 156 is referred to as a shift operation amount, the operation amount of the boom lever 157 is referred to as a boom operation amount, and the operation amount of the bucket lever 158 is referred to as a bucket operation amount.

The measurement value acquisition unit 312 acquires the measurement values from the fuel injection device 211, the engine tachometer 2101, the input shaft tachometer 2301, the output shaft tachometer 2302, the HST pressure gauge 2303, the first pump pressure gauge 2601, the pump capacity meter 2602, the lift pressure sensor 2603, and the second pump pressure gauge 2701. That is, the measurement value acquisition unit 312 acquires the measurement value of each of a fuel injection amount of the engine 210, the rotation speed of the engine 210, the rotation speed of the input shaft of the transmission 230, the rotation speed of the output shaft of the transmission 230, the pressure of the HST 231, a pump pressure of the variable capacity pump 260, the capacity of the variable capacity pump 260, the bottom pressure of the lift cylinder 124, and a pump pressure of the fixed capacity pump 270.

The vehicle state calculation unit 313 calculates the output torque of the engine 210, upper limit torque of the engine 210, angular acceleration of the engine 210, torque (PTO torque) distributed by the PTO 220 to the variable capacity pump 260 and the fixed capacity pump 270, an input-output speed ratio of the transmission 230, angular acceleration of the output shaft of the transmission 230, and a traveling speed of the work vehicle 100, based on the measurement value acquired by the measurement value acquisition unit 312. The output torque of the engine 210 is the torque that the engine 210 can actually exert, which is calculated based on the fuel injection amount. The upper limit torque of the engine 210 is the maximum torque that the engine 210 is capable of exerting.

The required PTO torque decision unit 314 decides a required value of the torque (required PTO torque) distributed from the PTO 220 to the variable capacity pump 260 and the fixed capacity pump 270, based on the steering operation amount, the boom operation amount, and the bucket operation amount acquired by the operation amount acquisition unit 311 and the measurement values of the pump pressure of the variable capacity pump 260, the capacity of the variable capacity pump 260, the pump pressure of the fixed capacity pump 270 acquired by the measurement value acquisition unit 312. For example, the required PTO torque decision unit 314 obtains the required flow rate of the variable capacity pump 260 from the steering operation amount based on a PTO conversion function that defines the relationship between the operation amount and the required flow rate. In addition, for example, the required PTO torque decision unit 314 obtains a required flow rate of the variable capacity pump 260 from the boom operation amount and the bucket operation amount based on the PTO conversion function. Then, the required PTO torque decision unit 314 decides the required PTO torque based on the measurement values of the pump pressure of the variable capacity pump 260, the capacity of the variable capacity pump 260, the pump pressure of the fixed capacity pump 270, and the specified required flow rate of the variable capacity pump 260.

The required output torque decision unit 315 decides a required value of the torque (required output torque) of the output shaft of the transmission 230 based on the accelerator operation amount, the brake operation amount, the shift operation amount, and the FNR operation amount acquired by the operation amount acquisition unit 311 and the traveling speed calculated by the vehicle state calculation unit 313. For example, the required output torque decision unit 315 decides the required output torque from the traveling speed calculated by the vehicle state calculation unit 313 based on a traveling conversion function that defines a relationship between the traveling speed and the required output torque. At this time, the required output torque decision unit 315 decides a characteristic of a traveling conversion function based on the accelerator operation amount, the brake operation amount, the shift operation amount, and the FNR operation amount.

Specifically, the required output torque decision unit 315 specifies a traveling conversion function corresponding to the speed range specified by the shift operation amount among a plurality of the traveling conversion functions corresponding to a plurality of the speed ranges. In a case in which there is an accelerator operation, the required output torque decision unit 315 transforms the specified traveling conversion function based on a magnification related to the accelerator operation amount. In a case in which there is a brake operation, the required output torque decision unit 315 transforms the specified traveling conversion function based on a magnification related to the brake operation amount. The required output torque decision unit 315 decides a sign of the required output torque based on the FNR operation amount. In addition, in a case where the signs of the required output torque and the traveling speed do not match (a case in which a sign of the product of the required output torque and the traveling speed is negative), the torque on a braking side is exerted by the transmission 230.

With the traveling conversion function, when the traveling speed exceeds a predetermined speed, the required output torque is a value on the braking side. Therefore, in the required output torque decision unit 315, in a case in which the traveling speed calculated by the vehicle state calculation unit 313 exceeds an upper limit of the speed range specified by the shift operation amount, the accelerator operation amount, and the brake operation amount, the required output torque becomes a value on the braking side (sign opposite to the traveling speed).

The traveling load estimation unit 316 estimates a traveling load torque $T_{load}$ related to traveling based on an output torque $T_{eng}$ of the engine 210, an angular acceleration $\alpha_{eng}$ of the engine 210, a PTO torque $T_{PTO}$, an input-output speed ratio i of the transmission 230, and an angular acceleration $\alpha_{out}$ of the output shaft of the transmission 230 calculated by the vehicle state calculation unit 313.

The traveling load torque $T_{load}$ can be calculated based on the following expression (1).

(Expression 1)

$$T_{load} = \frac{\eta_t}{i} N(T_{eng} - T_{PTO} - I_{eng}\alpha_{eng}) - \frac{I_v}{N}\alpha_{out} \qquad (1)$$

$I_{eng}$ is the moment of inertia of the engine 210. $I_v$ is the moment of inertia of the work vehicle 100. $\eta_t$ is the torque efficiency of the transmission 230. N is an axle reduction ratio between the output shaft of the transmission 230 and the front wheel portion 130 and the rear wheel portion 140. The moment of inertia $I_{eng}$, the moment of inertia $I_v$, the torque efficiency $\eta_t$, and the axle reduction ratio N are constant.

In addition, the expression (1) can be derived from an expression (2) indicating a relationship between the output torque $T_{eng}$ of the engine 210 and the output torque $T_{out}$ of the transmission 230 and an expression (3) indicating a relationship between the output torque $T_{out}$ of the transmission 230 and the acceleration αout of the work vehicle 100. In addition, in another embodiment, the traveling load torque $T_{load}$ may be calculated based on an expression other than the expression (1). For example, in place of the expression (2), an expression specifying the traveling load torque $T_{load}$ may be derived by using an expression indicating a relationship between the pressure of the HST 231 measured by the HST 231, a capacity command of the variable capacity pump of the HST 231 or the pump capacity measured by the pump capacity meter provided in the variable capacity pump, and the output torque $T_{out}$. In addition, in another embodiment, in a case where an electric motor is provided in the transmission 230, an expression specifying the traveling load torque $T_{load}$ may be derived by using a torque command of the electric motor or electric motor output torque estimated from the voltage and current.

(Expression 2)

$$T_{out} = \frac{\eta_t}{i}(T_{eng} - T_{PTO} - I_{eng}\alpha_{eng}) \qquad (2)$$

(Expression 3)

$$I_v \frac{1}{N}\alpha_{out} = NT_{out} - T_{load} \qquad (3)$$

The work state specification unit 317 specifies a work state of the work vehicle 100 based on the operation amount acquired by the operation amount acquisition unit 311 and the measurement values acquired by the measurement value acquisition unit 312. The value of the work state includes, for example, a "low-speed traveling state", a "high-speed traveling state", an "excavation state", or a "braking state".

The "low-speed traveling state" is a state in which the work vehicle 100 is traveling at a low speed. The work state specification unit 317 can determine that the work state is the "low-speed traveling state", when, for example, the absolute value of the traveling speed is less than a predetermined value. The work state specification unit 317 can determine that the work state is the "low-speed traveling state", when, for example, the shift operation amount is the first gear or the second gear.

The "high-speed traveling state" is a state in which the work vehicle 100 is moving forward or rearward. The work state specification unit 317 can determine that the work state is the "high-speed traveling state", when, for example, the absolute value of the traveling speed is equal to or greater than a predetermined value. The work state specification unit 317 can determine that the work state is the "high-speed traveling state", when, for example, the shift operation amount is the third gear or the fourth gear.

The "excavation state" is a state in which the work vehicle 100 is performing excavation work using the work equipment 120. The work state specification unit 317 can determine that the work state is the "excavation state", when, for example, the measured value of the bottom pressure of the lift cylinder 124 is equal to or greater than a predetermined value.

The "braking state" is a state in which the work vehicle 100 is braking. The work state specification unit 317 can determine that the work state is the "braking state", when, for example, the brake operation amount is larger than 0.

The target rotation speed decision unit 318 decides a target engine rotation speed used for controlling the engine 210 based on a required traveling power calculated from the required output torque and the traveling speed and a required engine output, which is a sum of the required PTO torque and a required PTO output calculated from the measurement value of the rotation speed of the engine 210. The target rotation speed decision unit 318 decides the target engine rotation speed based on a rotation speed conversion function that defines a relationship between the required engine output and the engine rotation speed, which is determined in advance by design or the like. The rotation speed conversion function may be designed to suppress the rotation of the engine 210 to a low rotation speed side as much as possible within a range, for example, in which the required engine output is capable of being exerted and the engine acceleration is not inhibited.

In addition, the target rotation speed decision unit 318 decides the engine rotation speed (PTO required rotation speed) required to realize the required flow rate of the variable capacity pump 260, which is calculated by the required PTO torque decision unit 314. The target rotation speed decision unit 318 decides the PTO required rotation speed based on a rotation speed conversion function that defines a relationship between the required flow rate of the variable capacity pump 260 and the engine rotation speed, which is determined in advance by design or the like. In a case where the target engine rotation speed is less than the PTO required rotation speed, the target rotation speed decision unit 318 decides the target engine rotation speed to be the PTO required rotation speed.

The acceleration torque specification unit 319 calculates a target acceleration torque required to rotate the engine 210 at the target engine rotation speed based on the measurement value of the rotation speed of the engine 210 acquired by the measurement value acquisition unit 312 and the target engine rotation speed decided by the target rotation speed decision unit 318. That is, the acceleration torque specification unit 319 decides a target engine acceleration from a difference between the measurement value of the rotation speed of the engine 210 and the target engine rotation speed and multiplies the target engine acceleration by the moment of inertia of the engine 210 to calculate the target acceleration torque.

The target engine torque decision unit 320 decides a target engine torque, which is the torque to be output by the engine 210, based on the PTO torque, the upper limit torque of the engine 210, and the input-output speed ratio of the transmission 230 calculated by the vehicle state calculation unit 313, the required output torque decided by the required output torque decision unit 315, and the measurement value of the rotation speed of the engine 210. The target engine torque decision unit 320 calculates a required input torque, which is the torque of the engine 210 required to obtain the required output torque, by multiplying the required output torque by the input-output speed ratio of the transmission 230. The target engine torque decision unit 320 decides a smaller value out of the sum of the PTO torque and the required input torque and the maximum value of the engine torque, as the target engine torque.

The engine control unit 321 outputs an engine torque command to the fuel injection device 211. Specifically, the engine control unit 321 outputs the engine torque command indicating the target engine torque decided by the target engine torque decision unit 320.

The target HST pressure specification unit 322 determines the pressure of the HST 231 corresponding to the required output torque decided by the required output torque decision unit 315 as a target HST pressure (target circuit pressure) which is a control target of the HST 231. The relationship between the output torque of the transmission 230 and the pressure of the HST 231 is determined by the relationship of the gear ratio between the output shaft and the HST motor 2312 defined by the design of the transmission 230, and the capacity of the HST motor 2312 at that time. That is, the target HST pressure decreases as the capacity of the HST motor 2312 increases, and the target HST pressure increases as the required output torque increases.

The margin decision unit 323 decides a margin pressure to be allowed for the difference between and the target HST pressure and the relief pressures of the first relief valve 2313 and the second relief valve 2315 based on the work state of the work vehicle 100 specified by the work state specification unit 317.

The margin pressure is decided in advance for each work state. When arranging the order of the margin pressures related to the work states in ascending manner, it is the margin pressure related to the braking state, the margin pressure related to the excavation state, the margin pressure related to the low-speed traveling state, and the margin pressure related to the high-speed traveling state. The margin pressure related to the braking state may be set so as to monotonically decrease with respect to the pressing amount of the brake pedal 153. When it is desired to apply a strong braking force, the margin pressure relating to the braking state may be set to a negative number.

The relief pressure setting unit 324 sets the relief pressures of the first relief valve 2313 and the second relief valve 2315 in the HST 231 to the sum of the target HST pressure specified by the target HST pressure specification unit 322 and the margin pressure decided by the margin decision unit 323.

The target speed ratio decision unit 325 decides a target input-output speed ratio of the transmission 230 based on the measurement value of the rotation speed of the input shaft of the transmission 230, the measurement value of the rotation speed of the output shaft of the transmission 230, the traveling load torque estimated by the traveling load estimation unit 316, the target output torque decided by the required output torque decision unit 315, and the target engine acceleration specified by the acceleration torque specification unit 319. Specifically, the target speed ratio decision unit 325 estimates the rotation speed of the output shaft of the transmission 230 after a lapse of time related to a predetermined control cycle based on the rotation speed of the output shaft of the transmission 230, the traveling load torque, and the target output torque, and sets the estimated rotation speed as the target rotation speed of the output shaft. The target speed ratio decision unit 325 estimates the rotation speed of the input shaft of the transmission 230 after a lapse of time related to a predetermined control cycle based on the rotation speed of the input shaft of the transmission 230 and the target engine acceleration, and sets the estimated rotation speed as the target rotation speed of the input shaft. The target speed ratio decision unit 325 decides the target input-output speed ratio by dividing the target rotation speed of the output shaft by the target rotation speed of the input shaft.

The transmission control unit 326 outputs a control command for the transmission 230 in order to achieve the target input-output speed ratio decided by the target speed ratio decision unit 325. The transmission control unit 326 outputs, for example, a capacity command for the HST 231 included in the transmission 230.

The pump control unit 327 outputs a control command for the variable capacity pump 260 in order to achieve the required PTO torque decided by the required PTO torque decision unit 314.

(Control Method for Work Vehicle)

Figure 6:
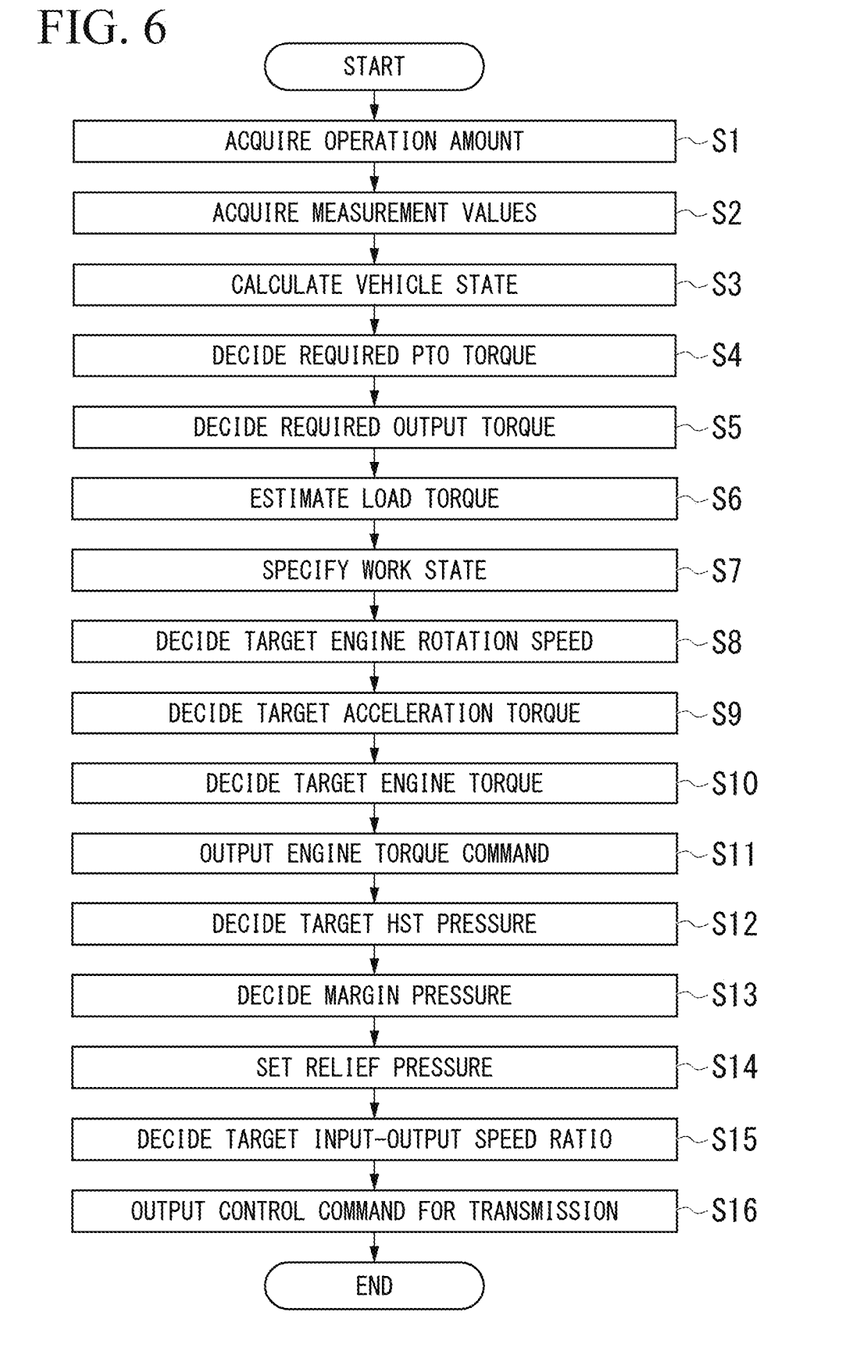
FIG. 6 is a flowchart illustrating a control method for the work vehicle according to the first embodiment.

FIG. 6 is a flowchart showing a control method for the work vehicle according to the first embodiment.

First, the operation amount acquisition unit 311 acquires the operation amount from each of the accelerator pedal 152, the brake pedal 153, the steering wheel 154, the forward-rearward selector switch 155, the shift switch 156, the boom lever 157, and the bucket lever 158 (step S1). In addition, the measurement value acquisition unit 312 acquires the measurement values from the fuel injection device 211, the engine tachometer 2101, the input shaft tachometer 2301, the output shaft tachometer 2302, the HST pressure gauge 2303, the first pump pressure gauge 2601, the pump capacity meter 2602, and the second pump pressure gauge 2701 (step S2).

Next, the vehicle state calculation unit 313 calculates the output torque of the engine 210, the upper limit torque of the engine 210, the angular acceleration of the engine 210, the PTO torque, the input-output speed ratio of the transmission 230, the angular acceleration of the output shaft of the transmission 230, and the traveling speed of the work vehicle 100, based on the measurement value acquired in step S2 (step S3).

The required PTO torque decision unit 314 decides the required PTO torque based on the steering operation amount, the boom operation amount, and the bucket operation amount acquired in step S1 the pump pressure and the capacity of the variable capacity pump 260 and the measurement value of the pump pressure of the fixed capacity pump 270 acquired in step S2 (step S4). The required output torque decision unit 315 decides the required output torque based on the operation amount related to traveling acquired in step S1 and the traveling speed calculated in step S3 (step S5). The traveling load estimation unit 316 estimates the traveling load torque based on a value of a vehicle state calculated in step S3 (step S6).

The work state specification unit 317 specifies the work state of the work vehicle 100 based on the operation amount acquired in step S1 and the measurement values acquired in step S2 (step S7). That is, the work state specification unit 317 specifies which one of the "low-speed traveling state", the "high-speed traveling state", the "excavation state", and the "braking state" the work state is.

The target rotation speed decision unit 318 decides a target engine rotation speed based on a required traveling power calculated from the required output torque and the traveling speed and a required engine output that is a sum of the required PTO torque and a required PTO output calculated from the measurement value of the rotation speed of the engine 210 (step S8). The acceleration torque specification unit 319 calculates the target acceleration torque based on the measurement value of the rotation speed of the engine 210 and the target engine rotation speed decided in step S8 (step S9). The target engine torque decision unit 320 decides the target engine torque based on the required output torque, the PTO torque, the upper limit torque of the engine, the input-output speed ratio of the transmission 230 calculated in step S3, and the measurement value of the rotation speed of the engine 210 acquired in step S2 (step S10). The engine control unit 321 outputs the engine torque command indicating the target engine torque decided in step S10 (step S11).

The target HST pressure specification unit 322 decides the target HST pressure based on the required output torque decided in step S5 and the latest capacity command of the HST motor 2312 (step S12). The margin decision unit 323 decides the margin pressure based on the work state of the work vehicle 100 specified in step S7 (step 13). Then, the relief pressure setting unit 324 sets the relief pressures of the first relief valve 2313 and the second relief valve 2315 of the HST 231 to the sum of the target HST pressure decided in step S12 and the margin pressure decided in step S13 (step S14).

The target speed ratio decision unit 325 decides the target input-output speed ratio based on the measurement value of the rotation speed of the input shaft of the transmission 230, the measurement value of the rotation speed of the output shaft of the transmission 230, the load torque, the target output torque, and the target engine acceleration (step S15). The transmission control unit 326 outputs a control command for the transmission 230 to achieve the target input-output speed ratio (step S16).

The control device 300 executes the above-described control processing for each predetermined control cycle.

(Examples of Setting of Relief Pressure)

Figure 7:
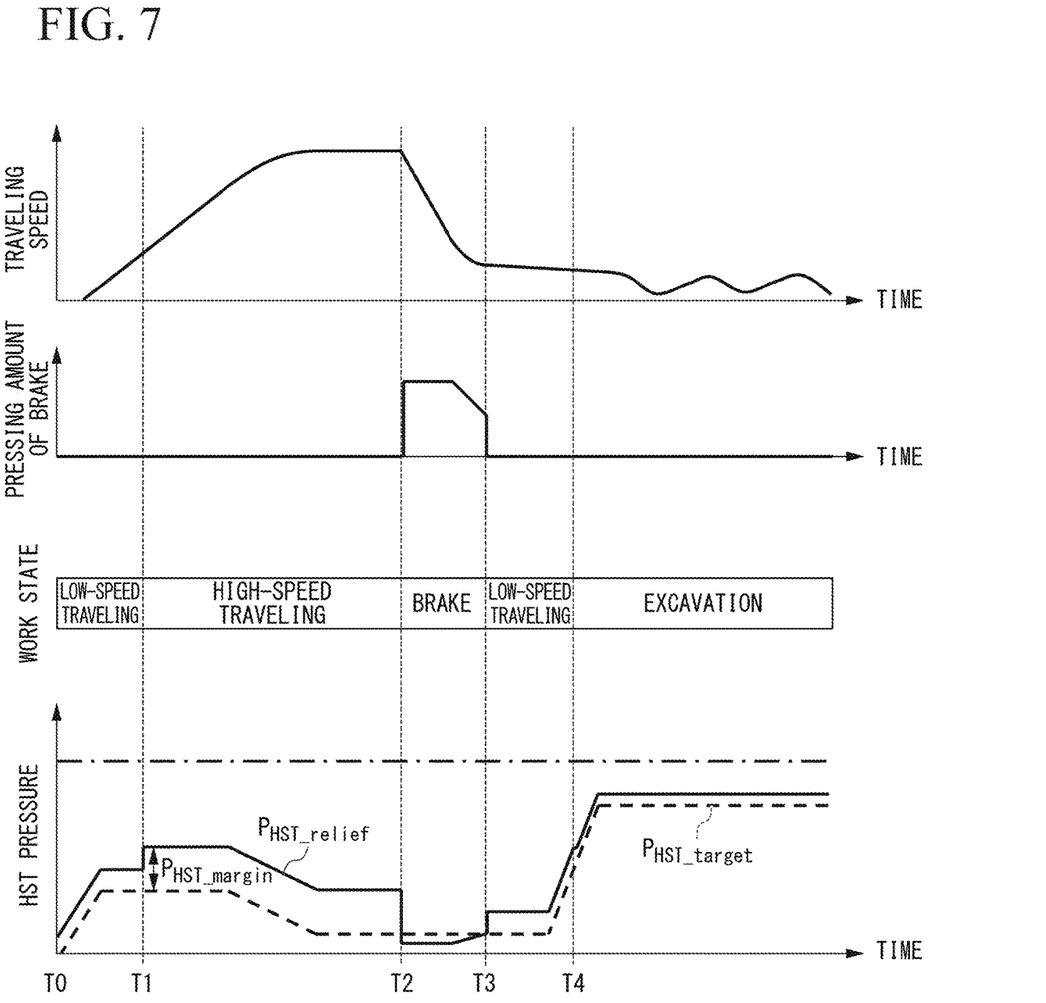
FIG. 7 is a diagram illustrating an example of setting a relief pressure related to the first embodiment.

Here, setting of the relief pressure by the control device 300 will be described using specific examples. FIG. 7 is a diagram illustrating an example of setting of the relief pressure according to the first embodiment. As described above, the relief pressure $P_{HST\_relief}$ is obtained by adding the margin pressure $P_{HST\_margin}$ to the target HST pressure $P_{HST\_target}$.

The work vehicle 100 starts traveling at the time T0. The traveling speed of the work vehicle 100 reaches a threshold speed at which the low-speed traveling state and the high-speed traveling state are distinguished from each other at the time T1. At this time, the work state specification unit 317 specifies that the work state of the work vehicle 100 is the low-speed traveling state from the time T0 to the time T1. For this reason, the margin decision unit 323 decides the margin pressure $P_{HST\_margin}$ to be added to the target HST pressure $P_{HST\_target}$ as the margin pressure related to the low-speed traveling state. When the work vehicle 100 is traveling at a low speed, fine accelerator work is required, and there is a high possibility of shifting to excavation work. Therefore, by setting the margin pressure $P_{HST\_margin}$ to a value smaller than that in the high-speed traveling state, the control device 300 can prevent the pressure of the HST 231 from being largely away from the target HST pressure $P_{HST\_target}$.

From the time T1 to the time T2, the traveling speed of the work vehicle 100 further increases. At this time, the work state specification unit 317 specifies that the work state of the work vehicle 100 is the high-speed traveling state from the time T1 to the time T2. Therefore, the margin decision unit 323 decides the margin pressure $P_{HST\_margin}$ to be a value larger than that in the low-speed traveling state. When the work vehicle 100 is traveling at a high speed, there is a low possibility of occurrence of a sudden load. Therefore, the control device 300 can reduce a release loss of the HST 231 by setting the margin pressure $P_{HST\_margin}$ to a value larger than that in the low-speed traveling state.

Next, during the period from the time T2 to the time T3, the operator of the work vehicle 100 presses the brake pedal 153. As a result, the traveling speed of the work vehicle 100 becomes less than the threshold speed at the time T3. At this time, the work state specification unit 317 specifies that the work state of the work vehicle 100 is the braking state from the time T2 to the time T3. Therefore, the margin decision unit 323 decides the margin pressure $P_{HST\_margin}$ to be a value that monotonically decreases with the pressing amount of the brake pedal 153. In addition, in the example shown in FIG. 7, the margin pressure $P_{HST\_margin}$ is a negative value. Thus, the control device 300 can positively promote the relief of the hydraulic oil and suppress the traction force to improve the braking performance.

Thereafter, during the period from time T3 to time T4, the work vehicle continues to travel at a speed less than the threshold speed. At this time, the work state specification unit 317 specifies that the work state of the work vehicle 100 is the low-speed traveling state from the time T3 to the time T4. Therefore, the margin decision unit 323 decides the margin pressure $P_{HST\_margin}$ to be a margin pressure related to low-speed traveling. In addition, the margin pressure $P_{HST\_margin}$ from the time T3 to the time T4 is the same value as the margin pressure $P_{HST\_margin}$ from the time T0 to the time T1.

When the bucket 122 of the work vehicle 100 pushes earth at the time T4, the pressure of the lift cylinder 124 increases. At this time, the work state specification unit 317 specifies that the work state of the work vehicle 100 is the excavation state on or after the time T4. Therefore, the margin decision unit 323 decides the margin pressure $P_{HST\_margin}$ to be a value smaller than that in the low-speed traveling state. When the work vehicle 100 performs excavation, there is a high possibility of occurrence of a rapid load fluctuation such as a load loss due to a tilt operation during excavation or a load loss due to the completion of excavation. Therefore, by setting the margin pressure $P_{HST\_margin}$ to a value smaller than that in the low-speed traveling state, the control device 300 can prevent the engine rotation speed from decreasing and prevent the vehicle from being jerked.

(Operation and Effects)

Figure 8:
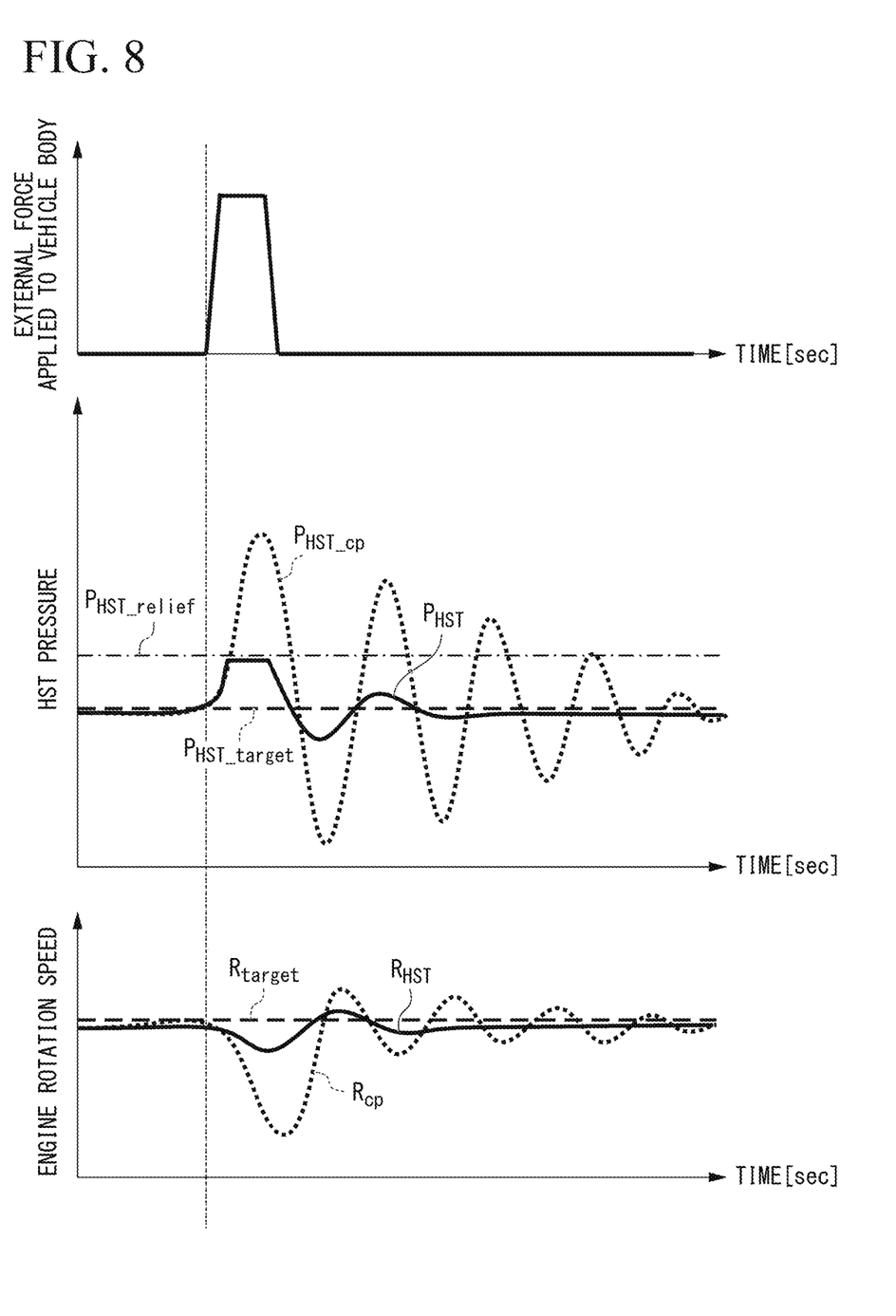
FIG. 8 is a diagram illustrating an effect of setting a relief pressure by a control device according to the first embodiment.

FIG. 8 is a diagram illustrating an effect of setting the relief pressure by the control device according to the first embodiment.

The control device 300 according to the first embodiment sets the relief pressure $P_{HST\_relief}$ of the first relief valve 2313 and the second relief valve 2315 in accordance with the target HST pressure $P_{HST\_target}$. In addition, the set relief pressure $P_{HST\_relief}$ of the first relief valve 2313 and the second relief valve 2315 may be the same value. As a result, as shown in FIG. 8, when a load fluctuation such as an external force being applied to the work vehicle 100 occurs, the internal pressure $P_{HST}$ of the HST 231 can be suppressed to a pressure corresponding to the target HST pressure $P_{HST\_target}$ or less. Therefore, according to the first embodiment, it is possible to prevent a rapid change in output torque due to a load fluctuation of the transmission 230.

As a comparative example, FIG. 8 shows the behavior in the case where the relief pressure $P_{HST\_relief}$ is not set; however, it can be seen that the internal pressure $P_{HST\_cp}$ of the HST 231 greatly increases according to the load fluctuation in the case where the relief pressure $P_{HST\_relief}$ is not set. Thereafter, the control device 300 controls the internal pressure of the HST 231 so as to be close to the target HST pressure $P_{HST\_target}$, thereby causing a sway back of the internal pressure. This sway back causes shaking of the pitch of the vehicle body, and thus the ride comfort is reduced. On the other hand, according to the first embodiment, since the internal pressure $P_{HST}$ of the HST 231 is suppressed to be equal to or less than the pressure corresponding to the target HST pressure $P_{HST\_target}$, it is possible to suppress the sway back and bring the internal pressure close to the target HST pressure $P_{HST\_target}$ at an early stage.

In addition, referring to FIG. 8, in the control according to the comparative example, the engine rotation speed remarkably decreases immediately after the occurrence of the load fluctuation. This is because a rapid load is transmitted from the HST 231 to the engine 210. On the other hand, according to the first embodiment, it is possible to prevent the load from being transmitted to the engine 210 by the relief of the HST 231 and to suppress a decrease in the engine rotation speed.

Although one embodiment has been described in detail with reference to the drawings, the specific configuration is not limited to that described above, and various design changes and the like can be made.

In addition, the work vehicle 100 according to the first embodiment is a wheel loader, but the present invention is not limited thereto. For example, the work vehicle 100 according to another embodiment may be another work vehicle 100, such as a bulldozer and a tractor. Also, in another embodiment, the control device 300 may be applied to a power machine other than the work vehicle.

Further, for example, according to the embodiment described above, the control device 300 sets the relief pressure based on the target HST pressure regardless of the work state; however, it is not limited to this in another embodiment. For example, another embodiment may be configured in a manner such that the control device 300 does not set the relief pressure in a case where the work state is in the high-speed traveling state, however sets the relief pressure in a case where the work state is in the other state.

In the above-described embodiment, the control device 300 varies the margin pressure according to the work state, however the present invention is not limited to this. For example, in another embodiment, the control device 300 may set the relief pressure by always using the same margin pressure.

According to the above disclosure of the present invention, the control device for the work vehicle can prevent a rapid change in output torque due to load fluctuation of the power transmission device.

The invention claimed is:

1. A control device of a work vehicle that includes
a power source,
a travel device, and
a power transmission device
including a hydrostatic continuously variable transmission having a relief valve capable of setting a relief pressure, and
configured to transmit power of the power source to the travel device,
the control device of the work vehicle comprising:
a relief pressure setting unit configured to set the relief pressure of the relief valve in accordance with a target output value of the travel device, and
a target speed ratio decision unit configured to decide a target input-output speed ratio of the power transmission device based on the target output value.

2. The control device of the work vehicle according to claim 1, further comprising:
a target circuit pressure specification unit configured to specify a target circuit pressure of a hydraulic circuit of the hydrostatic continuously variable transmission in order to achieve a target output value of the travel device,
the relief pressure setting unit being configured to set the relief pressure based on the specified target circuit pressure.

3. The control device of the work vehicle according to claim 1, further comprising:
a work state specification unit configured to specify a work state of the work vehicle; and
a margin decision unit configured to decide a margin pressure of a hydraulic circuit of the hydrostatic continuously variable transmission in accordance with the specified work state,
the relief pressure setting unit being configured to set the relief pressure based on the decided margin pressure.

4. The control device of the work vehicle according to claim 3, wherein
the margin decision unit is configured to set the margin pressure in a case in which the work state is an excavation state to be smaller than the margin pressure in a case where the work state is a traveling state.

5. The control device of the work vehicle according to claim 3, wherein
the margin decision unit is configured to set the margin pressure in a case where the work state is a braking state to be smaller than the margin pressure in a case where the work state is another state.

6. The control device of the work vehicle according to claim 5, wherein the margin pressure is a negative value when the work state is the braking state.

7. The control device of the work vehicle according to claim 3, wherein
when the work state of the travel device is a travel state, the margin decision unit is configured to set the margin pressure to be smaller as the traveling speed is lower.

8. A work vehicle comprising:
a power source;
a travel device;
a power transmission device configured to transmit power of the power source to the travel device; and
a control device configured to control the power transmission device,
the power transmission device including a hydrostatic continuously variable transmission having a relief valve capable of setting a relief pressure, and
the control device including a control unit configured to
set the relief pressure of the relief valve in accordance with a target output value of the travel device, and
decide a target input-output speed ratio of the power transmission device based on the target output value.

9. A control method for a work vehicle that includes
a power source;
a travel device; and
a power transmission device
including a hydrostatic continuously variable transmission having a relief valve capable of setting a relief pressure, and
configured to transmit power of the power source to the travel device,
the control method for the work vehicle, comprising:
setting the relief pressure of the relief valve in accordance with a target output value of the travel device, and
deciding a target input-output speed ratio of the power transmission device based on the target output value.

* * * * *